United States Patent
Tang et al.

(10) Patent No.: US 11,812,387 B2
(45) Date of Patent: Nov. 7, 2023

(54) METHOD AND APPARATUS FOR CONTROLLING POWER CONSUMPTION OF TERMINAL, AND STORAGE MEDIUM

(71) Applicant: GUANGDONG OPPO MOBILE TELECOMMUNICATIONS CORP., LTD., Guangdong (CN)

(72) Inventors: Kai Tang, Guangdong (CN); Yang Xia, Guangdong (CN); Yan Wang, Guangdong (CN); Xingsui Yang, Guangdong (CN); Tao Zhang, Guangdong (CN); Zhi Wang, Guangdong (CN); Zhengpeng Tan, Guangdong (CN); Yunteng Zhuang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 107 days.

(21) Appl. No.: 17/523,557

(22) Filed: Nov. 10, 2021

(65) Prior Publication Data

US 2022/0070771 A1 Mar. 3, 2022

Related U.S. Application Data

(63) Continuation of application No. PCT/CN2020/086155, filed on Apr. 22, 2020.

(30) Foreign Application Priority Data

May 16, 2019 (CN) .......................... 201910405971.7
Sep. 16, 2019 (CN) .......................... 201910872770.8

(51) Int. Cl.
*H04L 1/00* (2006.01)
*H04L 5/00* (2006.01)
(Continued)

(52) U.S. Cl.
CPC ....... *H04W 52/0258* (2013.01); *H04L 1/0002* (2013.01); *H04L 5/0055* (2013.01);
(Continued)

(58) Field of Classification Search
CPC .. H04B 7/02–12; H04B 17/0082–3913; H04L 1/0001–248; H04L 5/0001–0098;
(Continued)

(56) References Cited

U.S. PATENT DOCUMENTS

2016/0242191 A1* 8/2016 Liao .................. H04W 52/0212
2017/0164281 A1 6/2017 Chiba et al.
(Continued)

FOREIGN PATENT DOCUMENTS

CN 106714286 A 5/2017
CN 107809773 A 3/2018
(Continued)

OTHER PUBLICATIONS

Chinese First office action with English Translation for Chinese Application No. 201910872770.8, dated Feb. 10, 2021 (15 pages).
(Continued)

*Primary Examiner* — Timothy J Weidner
(74) *Attorney, Agent, or Firm* — Young Basile Hanlon & MacFarlane, P.C.

(57) ABSTRACT

Disclosed are a method and apparatus for controlling the power consumption of a terminal, and a storage medium. The method comprises: obtaining a temperature of the terminal; and in response to the temperature being greater than a first temperature threshold, controlling the terminal to switch from a dual-connection mode to a single-connection mode based on a power consumption adjustment strategy; wherein the terminal supports the dual-connection mode; the terminal is configured to communicate with a first base station and to communicate with a second base station in the
(Continued)

dual connection mode; the first base station is a primary base station, and the second base station is a secondary base station.

17 Claims, 3 Drawing Sheets

(51) Int. Cl.

| | | |
|---|---|---|
| H04W 24/08 | (2009.01) | |
| H04W 24/10 | (2009.01) | |
| H04W 28/02 | (2009.01) | |
| H04W 28/08 | (2023.01) | |
| H04W 36/00 | (2009.01) | |
| H04W 36/30 | (2009.01) | |
| H04W 48/02 | (2009.01) | |
| H04W 48/20 | (2009.01) | |
| H04W 52/02 | (2009.01) | |
| H04W 60/00 | (2009.01) | |
| H04W 60/04 | (2009.01) | |
| H04W 76/15 | (2018.01) | |
| H04W 76/18 | (2018.01) | |
| H04W 76/19 | (2018.01) | |
| H04W 76/20 | (2018.01) | |
| H04W 76/30 | (2018.01) | |
| H04W 76/34 | (2018.01) | |
| H04W 84/02 | (2009.01) | |
| H04W 88/06 | (2009.01) | |
| H04W 88/08 | (2009.01) | |
| H04W 92/02 | (2009.01) | |
| H04W 92/10 | (2009.01) | |
| H04W 28/086 | (2023.01) | |

(52) U.S. Cl.
CPC ........... *H04W 24/08* (2013.01); *H04W 24/10* (2013.01); *H04W 28/0278* (2013.01); *H04W 28/0865* (2023.05); *H04W 36/0069* (2018.08); *H04W 36/0085* (2018.08); *H04W 36/00698* (2023.05); *H04W 36/305* (2018.08); *H04W 48/02* (2013.01); *H04W 48/20* (2013.01); *H04W 52/028* (2013.01); *H04W 52/0212* (2013.01); *H04W 52/0261* (2013.01); *H04W 60/005* (2013.01); *H04W 60/04* (2013.01); *H04W 76/15* (2018.02); *H04W 76/18* (2018.02); *H04W 76/19* (2018.02); *H04W 76/20* (2018.02); *H04W 76/30* (2018.02); *H04W 76/34* (2018.02); *H04W 84/02* (2013.01); *H04W 88/06* (2013.01); *H04W 88/08* (2013.01); *H04W 92/02* (2013.01); *H04W 92/10* (2013.01); *Y02D 30/70* (2020.08)

(58) Field of Classification Search
CPC ..... H04W 8/22–245; H04W 24/02–10; H04W 28/02–26; H04W 36/0005–385; H04W 48/02–20; H04W 52/02–60; H04W 60/005–06; H04W 72/02–569; H04W 74/002–008; H04W 76/10–50; H04W 84/02–16; H04W 88/02–12; H04W 92/02–04; H04W 92/10; Y02D 30/70
See application file for complete search history.

(56) References Cited

U.S. PATENT DOCUMENTS

| | | | |
|---|---|---|---|
| 2020/0008152 A1 | 1/2020 | Stauffer et al. | |
| 2020/0145986 A1* | 5/2020 | Park | H04W 52/0212 |
| 2020/0351771 A1* | 11/2020 | Geekie | H04W 52/0212 |

FOREIGN PATENT DOCUMENTS

| | | | | |
|---|---|---|---|---|
| CN | 108632880 | A | 10/2018 | |
| CN | 108738079 | A | 11/2018 | |
| CN | 109587757 | A | 4/2019 | |
| CN | 110536346 | A | 12/2019 | |
| CN | 110913504 | A | 3/2020 | |
| EP | 3016449 | A1 | 5/2016 | |
| EP | 3565298 | A1 | 11/2019 | |
| EP | 3720240 | A1 | 10/2020 | |
| WO | WO-2018045804 | A1 * | 3/2018 | ........... H04W 52/26 |
| WO | 2018130115 | A1 | 7/2018 | |
| WO | 2020223520 | A1 | 11/2020 | |
| WO | 2021030422 | A1 | 2/2021 | |
| WO | 2021126798 | A1 | 6/2021 | |

OTHER PUBLICATIONS

International search report with English Translation for International Application No. PCT/CN2020/086155, dated Jul. 22, 2021 (14 pages).
Dynamic power allocation for power limited UE in dual-connectivity final, 3GPP TSG RAN WG1 Meeting #77 R1-142069, May 23, 2014.
Notification to Grant Patent Right for Invention with English Translation for Chinese Application No. 201910872770.8, dated Oct. 11, 2021 (6 pages).
Extended European Search Report for EP Application 20805914.7 dated May 12, 2022. (15 pages).
Chinese Office Action with English Translation for CN Application 201910869972.7 dated Mar. 23, 2022. (11 pages).

* cited by examiner

US 11,812,387 B2

METHOD AND APPARATUS FOR CONTROLLING POWER CONSUMPTION OF TERMINAL, AND STORAGE MEDIUM

CROSS-REFERENCE TO RELATED APPLICATION(S)

The present application is a continuation-application of International (PCT) Patent Application No. PCT/CN2020/086155, filed on Apr. 22, 2020, which claims foreign priority of Chinese Patent Application No. 201910405971.7 filed on May 16, 2019, and of Chinese Patent Application No. 201910872770.8 filed on Sep. 16, 2019, the entire contents of all of which are hereby incorporated by reference.

TECHNICAL FIELD

The present disclosure relates to the field of wireless technologies, and in particular to a method and an apparatus for controlling power consumption of a terminal, and a storage medium.

BACKGROUND

The fifth generation (5G) mobile communication system supports independent networking (Standalone, SA) architecture and non-independent networking (Non-Standalone, NSA) architecture. A typical NSA architecture is a dual-connection (DC) architecture.

In the DC architecture, a terminal can work in a dual-connection mode. In the dual-connection mode, the terminal communicates with two base stations. For example, the terminal communicates with both a long term evolution (LTE) base station and a new radio (NR) base station, resulting in high power consumption of the terminal.

SUMMARY

The present disclosure provides a method and an apparatus for controlling power consumption of a terminal, and a storage medium.

Technical solutions of the present disclosure may be achieved as followed.

Embodiments of the present disclosure provides a method for controlling power consumption of a terminal, comprising: obtaining a temperature of the terminal; and in response to the temperature being greater than a first temperature threshold, controlling the terminal to switch from a dual-connection mode to a single-connection mode based on a power consumption adjustment strategy; wherein the terminal supports the dual-connection mode; the terminal is configured to communicate with a first base station and to communicate with a second base station in the dual connection mode; the first base station is a primary base station, and the second base station is a secondary base station.

Embodiments of the present disclosure provides an apparatus for controlling power consumption of a terminal, comprising: a memory, a processor, and a computer program stored in the memory and executable on the processor; wherein the processor is configured to execute the computer program to perform the method for controlling power consumption of a terminal.

Embodiments of the present disclosure provides a non-transitory computer-readable storage medium, storing a computer instruction; wherein the computer instruction is executed by the processor to perform the method for controlling power consumption of a terminal.

DETAILED DESCRIPTION

The present disclosure will be further described in detail below in conjunction with the drawings and specific embodiments.

Figure 1:
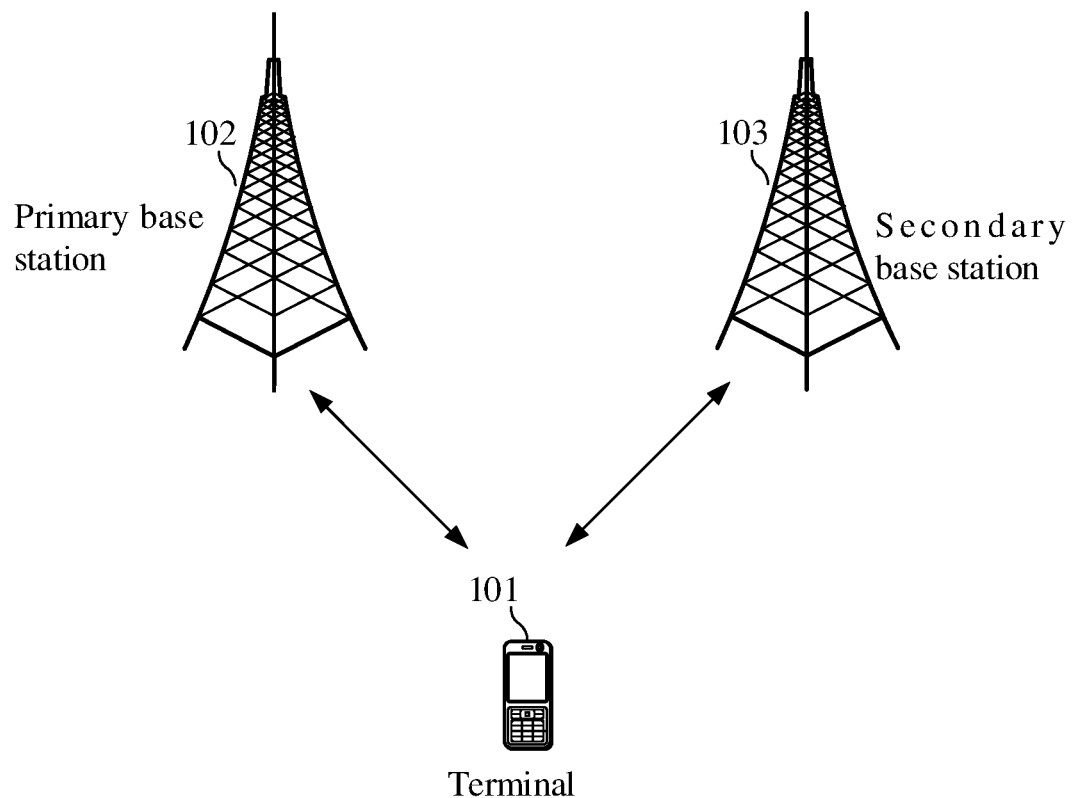
FIG. 1 is a schematic view of a system architecture applied by a method for controlling power consumption of a terminal according to an embodiment of the present disclosure.

FIG. 1 is a schematic view of a system architecture applied by a method for controlling power consumption of a terminal according to an embodiment of the present disclosure. As shown in FIG. 1, the system includes a terminal 101, a primary base station 102, and a secondary base station 103.

The terminal 101 is configured to establish an air interface connection with the primary base station 102 (also referred to as a primary node) to achieve communication with the primary base station 102; the terminal 101 is further configured to establish an air interface connection with the secondary base station 103 (also referred to as a secondary node) to achieve communication with the secondary base station 103; the terminal 101 is further configured to establish an air interface connection with the primary base station 102 and the secondary base station 103 at the same time to achieve communication with the primary base station 102 and the secondary base station 103 at the same time.

In a dual-connection mode, the terminal 101 simultaneously establishes two connections with the primary base station 102 and the secondary base station 103. The primary base station 102 is mainly responsible for transmitting signaling, and the secondary base station 103 is responsible for transmitting data. The technical solutions in the embodiments of the present disclosure are mainly aimed at the terminal in the dual-connection mode.

The types of the primary base station 102 and the secondary base station 103 shown in FIG. 1 may be the same or different. In an example, the primary base station 102 is an LTE base station, and the secondary base station 103 is an NR base station. In another example, the primary base station 102 is an NR base station, and the secondary base station 103 is also an NR base station. In further another example, the primary base station 102 is an NR base station, and the secondary base station 103 is an LTE base station.

The embodiments of the present disclosure do not limit the types of the primary base station 102 and the secondary base station 103.

In some embodiments, the dual-connection mode is an EN-DC mode or next generation EN-DC (NGEN-DC) mode. In this case, the primary base station is an LTE base station, the secondary base station is an NR base station, and the terminal communicates with both LTE base station and NR base station.

In other embodiments, the dual-connection mode is NR-evolved UMTS (NR-EUTRA, NE-DC) mode. In this case, the primary base station is an NR base station, the secondary base station is an LTE base station, and the terminal communicates with both LTE base station and NR base station.

It should be noted that the dual-connection mode is not limited to the aforementioned EN-DC mode and NE-DC mode, and the embodiments of the present disclosure does not limit the specific type of the dual-connection mode.

In specific implementation, a deployment mode of the primary base station and the secondary base station may be co-site deployment (for example, NR base station and LTE base station may be arranged on a single physical device), or non-co-site deployment (for example, NR base station and LTE base station may be arranged on different physical devices), which is not limited herein. The LTE base station may also be referred to as an evolved Node B (eNB), and the NR base station may also be referred to as a next generation Node B (gNB). It should be noted that the present disclosure does not limit the relationship between the coverage of the primary base station and the secondary base station, for example, the primary base station and the secondary base station may have overlapped coverage.

The specific type of the terminal 101 is not limited in the present disclosure. It can be any user equipment that supports the dual-connection mode, such as a smart phone, a personal computer, a notebook computer, a tablet computer, a portable wearable device, etc.

The application scenario of the embodiments in the present disclosure may be that in a non-independent networking of 5G, when the temperature of the terminal is high, if the terminal remains in dual connection with the primary base station and the secondary base station, the terminal communicates with the primary base station resulting in power consumption, also with the secondary base station resulting in power consumption, such that the power consumption of the terminal increases. Therefore, when the temperature of the terminal is greater than a first temperature threshold, the terminal may be disconnected from or not connected with the secondary base station, thereby remaining in a single-connection mode and further reducing the power consumption of the terminal.

Figure 2:
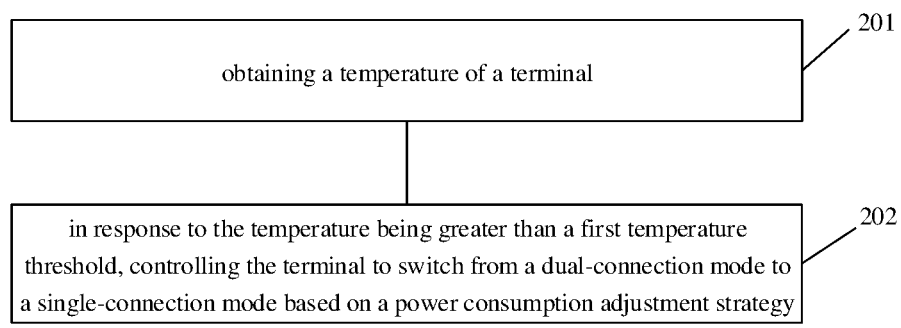
FIG. 2 is a flowchart of a method for controlling power consumption of a terminal according to an embodiment of the present disclosure.

FIG. 2 is a flowchart of a method for controlling power consumption of a terminal according to an embodiment of the present disclosure. As shown in FIG. 2, the method may include operations as followed.

At block 201: obtaining a temperature of a terminal.

The terminal herein supports a dual-connection mode. In the dual-connection mode, the terminal communicates with both a first base station and a second base station; the first base station is a primary base station, and the second base station is a secondary base station.

To realize simultaneous communication with the two base stations, the terminal is required to include two sets of communication modules, and the two sets of communication modules respectively correspond to the two base stations. A first modem module and a first radio frequency path (including a first radio frequency circuit and a first radio frequency antenna) form a first communication module set, and the first communication module set corresponds to the first base station. A second modem module and a second radio frequency path (including a second radio frequency circuit and a second radio frequency antenna) form a second communication module set, and the second communication module set corresponds to the second base station. In an example, the first modem module is a 5G modem, the second modem module is a 4G modem, the first radio frequency circuit is 5G RF, and the second radio frequency circuit is 4G RF. In the dual-connection mode, the first communication module and the second communication module work simultaneously.

In practical applications, taking the EN-DC mode of 5G non-independent networking as an example, the terminal may establish a connection with both the primary base station (i.e., the LTE base station), and the secondary base station (i.e., the NR base station). The LTE base station may be responsible for transmitting signaling and the NR base station may be responsible for transmitting data, such that when the temperature of the terminal is high, if the terminal still communicates with both the NR base station and the LTE base station, the power consumption of the terminal may be too high, which in turn shortens the standby time of the terminal. To achieve the best compromise between terminal performance and power consumption, the power consumption of the terminal may be controlled based on the temperature of the terminal.

The obtaining the temperature of the terminal may include: obtaining the temperature of the terminal through a temperature sensor arranged in the terminal.

The specific manner of the obtaining the temperature of the terminal is not limited, and the temperature may be obtained periodically or through monitoring.

In practical applications, the terminal may be arranged with a virtual switch. When a user turns on the virtual switch through a touch operation, the terminal determines that it is required to optimize its own power consumption and starts to obtain the temperature of the terminal.

Figure 3:
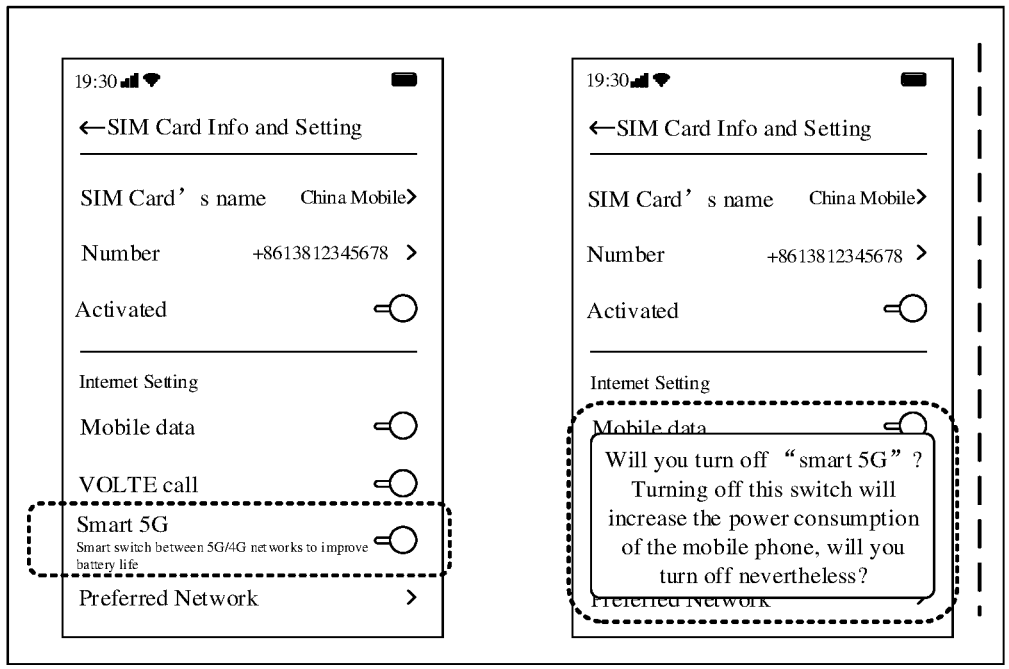
FIG. 3 is a schematic view of a virtual switch arranged in a terminal according to an embodiment of the present disclosure.
Figure 4:
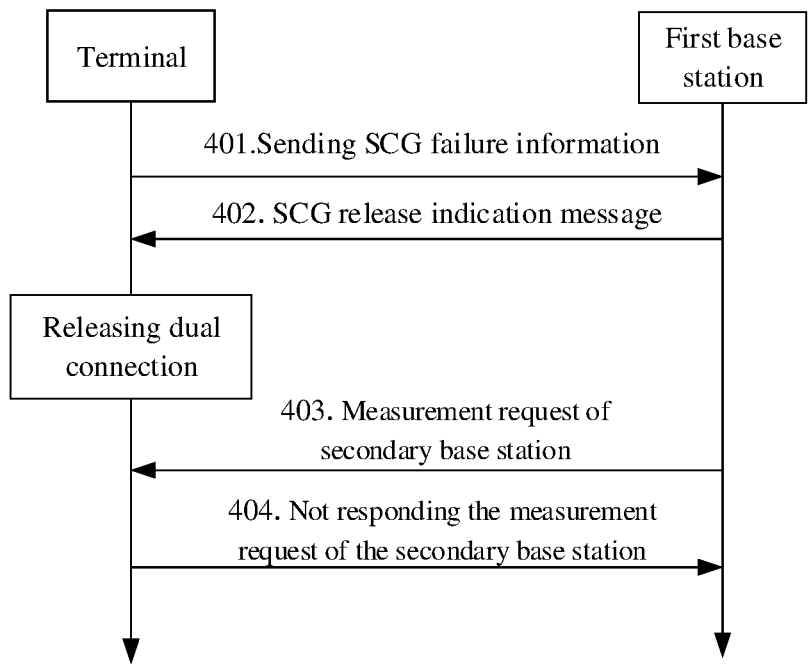
FIG. 4 is a flowchart of a terminal disabling a dual-connection mode by sending secondary cell group (SCG) failure information according to an embodiment of the present disclosure.

For example, as shown in FIG. 3, the terminal may be arranged with the virtual switch such as "smart 5G". When the user turns on the virtual switch through a touch operation, the terminal determines that it is required to optimize its own power consumption, and obtains the temperature of the terminal. When the user turns off the virtual switch through another touch operation, the terminal may generate a prompt message such as "turning off this switch will increase the power consumption of the mobile phone, will you turn off nevertheless?", and determine whether receiving a confirmation operation for the prompt information. In response to receiving the confirmation operation, the terminal determines that it is not required to optimize its own power consumption.

At block 202: in response to the temperature being greater than a first temperature threshold, controlling the terminal to switch from a dual-connection mode to a single-connection mode based on a power consumption adjustment strategy.

The terminal may refer to a terminal that supports the dual-connection mode. In the dual-connection mode, the terminal communicates with both the first base station and the second base station; in the single connection mode, the terminal communicates with the first base station; the first base station is the primary base station, and the second base station is the secondary base station.

When the terminal is in the dual-connection mode and the temperature is greater than the first temperature threshold, the terminal is controlled to switch from the dual-connection mode to the single-connection mode based on the power consumption adjustment strategy.

When the terminal is in the dual-connection mode and the temperature is greater than a second temperature threshold, a data transmission rate between the terminal and the second base station is controlled to switch from a first rate to a second rate; the second temperature threshold is less than the first temperature threshold, and the second rate is less than the first rate.

In actual applications, to prevent the terminal from still working in the dual-connection mode when the temperature is greater than the second temperature threshold, resulting in a sharp drop in the power consumption of the terminal, the terminal may reduce a downlink transmission rate for communication with the second base station by reducing a reported value of channel quality indicator (CQI) when the temperature is greater than the second temperature threshold, so as to extend the standby time of the terminal.

Based on this, in some embodiments, the controlling the data transmission rate between the terminal and the second base station from the first rate to the second rate includes: determining a first parameter, wherein the first parameter is configured to indicate a channel quality of the second base station; reducing the value of the first parameter; and sending the reduced first parameter to the second base station; wherein the reduced first parameter is configured to control a downlink transmission rate to switch from the first rate to the second rate.

The value of the first parameter may refer to the CQI value.

The reducing the reported value of CQI may specifically include: measuring, by the terminal, a cell and obtaining a measurement result such as a signal to interference plus noise ratio (SINR); determining a decoding error rate of a physical downlink shared channel (PDSCH) such as a block error rate (BLER) based on the measurement result, and determining the value of the CQI based on a limit of BLER<10%; reducing the value of the determined CQI based on a preset value, and sending the reduced CQI to the second base station. For example, assuming that the preset value is 1, if the determined value of CQI is 10, the value of the reduced CQI is 10−1=9.

It should be noted that, since the terminal reduces the reported value of CQI, the network device reduces an index value of modulation and coding scheme (MCS) based on the reduced CQI value, such that the downlink transmission rate of the communication between the terminal and the second base station is reduced, and the standby time of the terminal may be thus extended.

In actual applications, to prevent the terminal from still working in the dual-connection mode when the temperature is greater than the second temperature threshold, resulting in a sharp drop in the power consumption of the terminal, when the temperature is greater than the second temperature threshold, the terminal may reduce a downlink transmission rate for communication with the second base station by changing an ACK response to the PDSCH, so as to extend the standby time of the terminal.

Based on this, in some embodiments, the controlling the data transmission rate between the terminal and the second base station from the first rate to the second rate includes: replacing a data packet of the ACK response to the PDSCH with a data packet of a NACK response to the PDSCH, so as to reduce the downlink transmission rate for communication with the second base station.

It should be noted that, since the terminal replaces the ACK response to the PDSCH with the NACK response, the network device may determine that the network signal coverage of the terminal is poor according to the NACK response, thereby reducing the index value of MCS. Further, the coding efficiency of the modulation and coding scheme determined by the reduced index value of MCS is poor, thereby reducing the downlink transmission rate for communication with the second base station. In this way, excessive power consumption of the terminal may be avoided, and the standby time of the terminal may be thus extended.

In actual applications, to prevent the terminal from still working in the dual-connection mode when the temperature is greater than the second temperature threshold, resulting in a sharp drop in the power consumption of the terminal, when the temperature is greater than the second temperature threshold, the terminal may reduce an uplink transmission rate for communication with the second base station by limiting the amount of data reported by a buffer status report (BSR), so as to extend the standby time of the terminal.

Based on this, in some embodiments, the controlling the data transmission rate between the terminal and the second base station from the first rate to the second rate includes: determining a second parameter, wherein the second parameter is configured to indicate the data amount of uplink data to be sent by the terminal to the second base station; reducing the value of the second parameter; and sending the reduced second parameter to the second base station, wherein the reduced second parameter is configured to control an uplink transmission rate to switch from the first rate to the second rate.

The value of the second parameter may refer to the BSR value.

The reducing the BSR value may specifically include: reducing the amount of data reported by the BSR based on a preset value. For example, assuming that the preset value is 1 Kbit, if the amount of data reported by the BSR of the terminal is 10 Kbit, the reduced data amount reported by the BSR is 9 Kbit.

It should be noted that, since the terminal reduces the amount of data reported by the BSR, the amount of uplink transmission resources of the second base station is reduced to be the amount of uplink transmission resources scheduled by the terminal based on the reduced BSR value, thereby reducing the uplink transmission rate. In this way, excessive power consumption of the terminal may be avoided, and the standby time of the terminal may be thus extended.

In actual applications, to prevent the terminal from still working in the dual-connection mode when the temperature is greater than the second temperature threshold, resulting in a sharp drop in the power consumption of the terminal, when the temperature is greater than the second temperature threshold, the terminal may reduce an uplink transmission rate for communication with the second base station by limiting a data rate between an application layer of the terminal and a modem of the terminal, so as to avoid excessive power consumption of the terminal, and thereby extend the standby time of the terminal.

Based on this, in some embodiments, the controlling the data transmission rate between the terminal and the second base station from the first rate to the second rate includes: reducing an uplink transmission rate for communication with the second base station by reducing a transmission rate of uplink data sent by an application layer of the terminal to a first modem of the terminal.

The data transmitted between the application layer of the terminal and the first modem of the terminal may be image data, audio data, etc. The application layer may refer to a system application layer or a third-party application layer, such as an application layer corresponding to a video application, an application layer corresponding to a chat software application, etc.

It should be noted that, since the terminal reduces the data transmission rate between the application layer of the terminal and the first modem of the terminal, the uplink transmission rate of the communication between the terminal and the second base station may be reduced. In this way, excessive power consumption of the terminal may be avoided, and the standby time of the terminal may be extended.

In actual applications, to prevent the terminal from still working in the dual-connection mode when the temperature is greater than the second temperature threshold, resulting in a sharp drop in the power consumption of the terminal, when the temperature is greater than the second temperature threshold, the terminal may reduce an uplink transmission power to extend the standby time of the terminal.

Based on this, in some embodiments, the controlling the uplink transmission rate for communication with the second base station from the first rate to the second rate includes: controlling the uplink transmission rate for communication with the second base station to be switched from the first rate to the second rate by reducing an uplink transmission power of the terminal.

In actual applications, to prevent that the terminal still communicates with the first base station and the second base station when the temperature is high, resulting in a sharp drop in the power consumption of the terminal, the terminal may be determined to disable the dual-connection mode when the temperature is greater than the first temperature threshold, such that excessive power consumption of the terminal may be avoided, and the standby time of the terminal may be extended.

Based on this, in some embodiments, after adjusting the data transmission rate between the terminal and the second base station from the first rate to the second rate, the method further includes: determining whether the temperature is greater than the first temperature threshold; and in response to the temperature being greater than the first temperature threshold, controlling the terminal to switch from the dual-connection mode to the single-connection mode based on the power consumption adjustment strategy.

The power consumption adjustment strategy may refer to a strategy that can prevent the terminal from activating the dual-connection mode. The power consumption adjustment strategy may also refer to a strategy that can reduce the probability of the terminal activating the dual-connection mode. Specifically, the power consumption adjustment strategy may include the following two types:

A first power consumption adjustment strategy: when the current mode of the terminal is the single-connection mode, after receiving a measurement request of the secondary base station sent by the first base station, the terminal may not respond to the measurement request of the secondary base station, or not report the measurement result of the secondary base station, thereby preventing the network device from configuring the dual-connection mode, preventing the terminal from activating the dual-connection mode, and finally controlling the terminal to switch from the dual-connection mode to the single-connection mode. The single-connection mode may refer to that the terminal establishes a connection with the first base station.

A second power consumption adjustment strategy: when the current mode of the terminal is the dual-connection mode, the terminal may send SCG failure information to the first base station to avoid the first base station from configuring the dual-connection mode, thereby preventing the terminal from activating the dual-connection mode, and finally controlling the terminal to switch from the dual-connection mode to the single-connection mode.

In actual applications, after receiving a measurement request of the second base station sent by the first base station, when the current mode of the terminal is the single-connection mode, the terminal may be adopted with the first power consumption adjustment strategy without responding to the measurement request of the second base station, thereby preventing the network device from configuring the dual-connection mode, and preventing the terminal from activating the dual-connection mode.

Based on this, in some embodiments, the controlling the terminal to switch from the dual-connection mode to the single-connection mode based on the power consumption adjustment strategy includes: receiving a measurement request of the second base station sent by the first base station, wherein the measurement request of the second base station is configured to instruct the terminal to measure the second base station in the network device; and not responding to the measurement request of the second base station.

In actual applications, for the EN-DC mode, the measurement request may specifically be an event numbered B1 in which the network device configures LTE to NR for the terminal.

The not responding to the measurement request may mean that the terminal does not perform measurement on the second base station according to the measurement request after receiving the measurement request.

For example, after receiving the measurement request of the second base station, the terminal may discard the measurement request, that is, not save the measurement request of the second base station.

It should be noted that, since the terminal does not respond to the measurement request, the terminal may not perform measurement on the second base station, and thus may not obtain the measurement report of the second base station. In this way, the terminal may not send the measurement report to the network device, and the network device may not configure the dual-connection mode according to the measurement report of the second base station reported by the terminal, such that the terminal works in a single-connection mode, and the terminal actively chooses not to communicate with the second base station in the non-independent network. Compared with the method in the related art that the terminal is required to communicate with the primary base station and the second base station, the power consumption of the terminal to communicate with the two base stations may be reduced, thereby increasing the standby time of the terminal.

To avoid that the terminal communicates with the LTE base station and the NR base station even when the temperature is greater than the first temperature threshold, thus causing a sharp drop in the power of the terminal, the terminal may determine that the dual-connection mode is disabled when the temperature is greater than the first temperature threshold and perform the dual-connection disable operation. In this way, excessive power consumption of the terminal may be avoided, and the standby time of the terminal may be extended.

In actual applications, after receiving the measurement request of the second base station sent by the first base station, when the terminal is in the single-connection mode, the terminal may apply the first power consumption adjustment strategy without reporting the measurement report of the second base station, thereby preventing the network device from configuring the dual-connection mode, and preventing the terminal from activating the dual-connection mode.

Based on this, in some embodiments, the controlling the terminal to disable the dual-connection mode based on the power consumption adjustment strategy includes: receiving a measurement request sent by the first base station, wherein the measurement request is configured to instruct the terminal to measure the second base station; performing measurement on the second base station to obtain a measurement result of the second base station based on the measurement request; sending a measurement report to the first base station, wherein the measurement report does not include the measurement result of the second base station.

The measurement result of sent by the terminal to the network device not including the measurement result of the second base station may mean that the terminal does not send the measurement result of the second base station to the network device.

For example, after measuring the second base station and obtaining the measurement result of the second base station, the terminal may discard the measurement result of the second base station, that is, not save the measurement result of the second base station.

It should be noted that, although the terminal measures the second base station according to the measurement request of the second base station, when the terminal sends the measurement report to the network device, the measurement result of the second base station is not sent to the network device. In this way, the network device may not configure the dual-connection mode according to the measurement result of the second base station reported by the terminal, such that the terminal remains in the single-connection mode, and the terminal may actively chooses not to communicate with the second base station in the non-independent network. Compared with the method in the related art that the terminal is required to communicate with the primary base station and the secondary base station, the power consumption of the terminal to communicate with the two base stations may be reduced, thereby increasing the standby time of the terminal.

In practical applications, when the current mode of the terminal is the dual-connection mode, the terminal may be adopted with the second power consumption adjustment strategy, thereby controlling the terminal to switch from the dual-connection mode to the single-connection mode.

Based on this, in some embodiments, the controlling the terminal to switch from the dual-connection mode to the single-connection mode based on the power consumption adjustment strategy includes: sending SCG failure information to the first base station, wherein the SCG failure information indicates that dual connection fails; receiving a SCG release indication message sent by the first base station; and releasing the dual-connection based on the SCG release indication message.

The SCG failure information may contain the measurement report of the second base station. Alternatively, NR SCG failure information may not contain the measurement report of the second base station.

To prevent that after the terminal releases the dual-connection, the network device reconfigures the dual-connection mode according to the measurement report of the second base station sent by the terminal, the SCG failure information may not include the measurement report of the second base station.

The terminal may receive the SCG release indication message sent by the first base station through an RRC connection reconfiguration message.

After the dual-connection is released, the terminal may return to the single-connection mode from the dual-connection mode and remain in the single-connection mode.

The terminal may not respond to the measurement request of the second base station or not report the measurement report of the second base station after receiving the measurement request sent by the first base station, after returning from the dual-connection mode to the single-connection mode, thereby preventing the network device from configuring the dual-connection mode, thereby preventing the terminal from activating the dual-connection mode, and finally controlling the terminal to remain in the single-connection mode.

It should be noted that the terminal sends the SCG failure information to the network device, receives the SCG release indication message sent by the network device, and releases the dual-connection according to the SCG release indication message, thereby returning from the dual-connection mode to the single-connection mode, such that the terminal actively chooses not to communicate with the second base station in the non-independent network. Compared with the method in the related art that the terminal is required to communicate with the primary base station and the second base station, the power consumption of the terminal to communicate with the two base stations may be reduced, thereby increasing the standby time of the terminal.

In actual applications, the terminal may be controlled to switch from the dual-connection mode to single-connection mode based on the power consumption adjustment strategy, or the terminal may be controlled to switch from the single-connection mode to dual-connection mode based on the power consumption adjustment strategy.

Based on this, in some embodiments, the method further includes: in response to the temperature being less than or equal to the first temperature threshold, controlling the terminal to switch from the single-connection mode to the dual-connection mode based on the power consumption adjustment strategy.

The process of controlling the terminal to switch from the dual-connection mode to single-connection mode based on the power adjustment strategy is similar to the process of controlling the terminal to switch from the single-connection mode to dual-connection mode based on the power consumption adjustment strategy, and will not be repeated here.

In the technical solutions provided by the embodiments of the present disclosure, in response to the temperature less than or equal to the first temperature threshold, the terminal may be controlled to switch from the single-connection mode to the dual-connection mode based on the power consumption adjustment strategy. Compared with the method in the related art that the terminal is required to communicate with the primary base station and the second base station in the non-independent networking, excessive power consumption of the terminal in the dual-connection mode may be avoided, thus the power consumption of the terminal will be reduced and the standby time of the terminal may be thus extended.

The following is a detailed description of the method for controlling power consumption of the terminal provided by the embodiments of the present disclosure in conjunction with specific examples.

At block 401: sending, by the terminal, SCG failure information to the first base station.

The first network is a 5G network (also called NR network), the second network is a 4G network (also called LTE network), the terminal is in the dual-connection mode, and the terminal communicates with the first base station (LTE base station) and the second base station (NR base station).

At block 402: sending, by the first base station, an SCG release indication message to the terminal.

The terminal releases the dual connection based on the SCG release indication message. After releasing the dual connection, the terminal may return from the dual-connection mode to the single-connection mode and remain in the single-connection mode.

It should be noted that here, in case the temperature of the terminal is greater than the first temperature threshold, by sending the SCG failure information to the first base station, the terminal may actively choose not to communicate with the second base station, which can reduce the power consumed by the terminal to communicate with both the base stations compared to the prior art in which the terminal is required to communicate with both primary and secondary base stations, thus increasing the standby time of the terminal.

At block 403: receiving, by the terminal, the measurement request of the second base station sent by the first base station.

At block 404: not responding, by the terminal, the measurement request of the second base station.

The terminal may not respond to the measurement request of the second base station or not report the measurement request of the second base station, thus preventing the first base station from configuring the dual-connection mode to the terminal, and thus preventing the terminal from activating the dual-connection mode, and finally controlling the terminal to remain in the single-connection mode.

Figure 5:
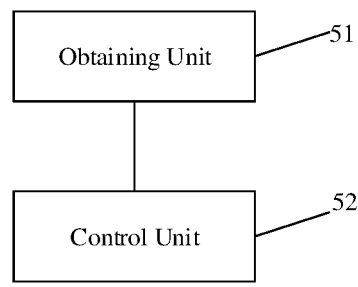
FIG. 5 is a composition structural schematic view of an apparatus for controlling power consumption of a terminal according to an embodiment of the present disclosure.

To implement the method for controlling power consumption of the terminal in the embodiments of the present disclosure, the embodiments of the present disclosure also provides an apparatus for controlling power consumption of a terminal. FIG. 5 is a composition structural schematic view of an apparatus for controlling power consumption of a terminal according to an embodiment of the present disclosure. The apparatus may include:

an obtaining unit 51, configured to obtain a temperature of the terminal; and a control unit 52, configured to, in response to the temperature being greater than a first temperature threshold, control the terminal to switch from a dual-connection mode to a single-connection mode based on a power consumption adjustment strategy.

The terminal may support a dual-connection mode. In the dual-connection mode, the terminal communicates with both a first base station and a second base station; the first base station is a primary base station, and the second base station is a secondary base station.

In some embodiments, the obtaining unit 51 is specifically configured to: detect whether a first instruction is received, wherein the first instruction is configured to instruct to reduce the power consumption of the terminal; and obtain the temperature of the terminal in response to receiving the first instruction.

In some embodiments, the control unit 52 is specifically configured to: in response to the terminal being in the dual-connection mode and the temperature being greater than a second temperature threshold, controlling a data transmission rate between the terminal and the second base station to switch from a first rate to a second rate; wherein the second temperature threshold is less than the first temperature threshold, and the second rate is less than the first rate.

In actual applications, the terminal may reduce a downlink transmission rate for communication with the second base station by reducing a reported value of channel quality indicator (CQI) when the temperature is greater than the second temperature threshold, so as to extend the standby time of the terminal.

Based on this, in some embodiments, the control unit 52 is specifically configured to: determine a first parameter, wherein the first parameter is configured to indicate a channel quality of the second base station; reduce the value of the first parameter; and send the reduced first parameter to the second base station; wherein the reduced first parameter is configured to reduce a downlink transmission rate.

The value of the first parameter may refer to the CQI value.

It should be noted that, since the terminal reduces the reported value of CQI, the network device reduces an index value of modulation and coding strategy (MCS) based on the reduced CQI value, such that the downlink transmission rate of the communication between the terminal and the second base station is reduced, and the standby time of the terminal may be thus extended.

In actual applications, when the temperature is greater than the second temperature threshold, the terminal may reduce a downlink transmission rate for communication with the second base station by changing an ACK response to the PDSCH, so as to extend the standby time of the terminal.

Based on this, in some embodiments, the control unit 52 is specifically configured to: replace a data packet of the ACK response to the PDSCH with a data packet of a NACK response to the PDSCH, so as to reduce the downlink transmission rate for communication with the second base station.

It should be noted that, since the terminal replaces the ACK response to the PDSCH with the NACK response, the network device may determine that the network signal coverage of the terminal is poor according to the NACK response, thereby reducing the index value of MCS. Further, the coding efficiency of the modulation and coding scheme determined by the reduced index value of MCS is poor, thereby reducing the downlink transmission rate for communication with the second base station. In this way, excessive power consumption of the terminal may be avoided, and the standby time of the terminal may be thus extended.

In actual applications, when the temperature is greater than the second temperature threshold, the terminal may reduce an uplink transmission rate for communication with the second base station by limiting the amount of data reported by the BSR, so as to extend the standby time of the terminal.

Based on this, in some embodiments, the control unit 52 is specifically configured to: determine a second parameter, wherein the second parameter is configured to indicate the data amount of uplink data to be sent by the terminal to the second base station; reduce the value of the second parameter; and send the reduced second parameter to the second base station, wherein the reduced second parameter is configured to reduce an uplink transmission rate.

The value of the second parameter may refer to the BSR value.

In actual applications, when the temperature is greater than the second temperature threshold, the terminal may reduce an uplink transmission rate for communication with the second base station by limiting a data rate between an application layer of the terminal and a modem of the terminal, so as to avoid excessive power consumption of the terminal, and thereby extend the standby time of the terminal.

Based on this, in some embodiments, the control unit 52 is specifically configured to: reduce an uplink transmission rate for communication with the second base station by reducing a transmission rate of uplink data sent by an application layer of the terminal to a first modem of the terminal.

In actual applications, when the temperature is greater than the second temperature threshold, the terminal may reduce an uplink transmission power to avoid that the power consumption of the terminal is too high and extend the standby time of the terminal.

Based on this, in some embodiments, the control unit 52 is specifically configured to: reduce the uplink transmission rate for communication with the second base station by reducing an uplink transmission power of the terminal.

In actual applications, when the temperature is greater than the first temperature threshold, the terminal may be determined to disable the dual-connection mode, such that excessive power consumption of the terminal may be avoided, and the standby time of the terminal may be extended.

Based on this, in some embodiments, the control unit 52 is specifically configured to: determine whether the temperature is greater than the first temperature threshold; and in response to the temperature being greater than the first temperature threshold, control the terminal to switch from the dual-connection mode to the single-connection mode based on the power consumption adjustment strategy, thereby reducing the power consumption of the terminal.

In actual applications, after receiving a measurement request of the second base station sent by the first base station and the controlling the terminal to switch from the dual-connection mode to the single-connection mode, the terminal may be adopted with a first power consumption adjustment strategy without responding to the measurement request of the second base station, thereby preventing the network device from configuring the dual-connection mode, and preventing the terminal from activating the dual-connection mode.

Based on this, in some embodiments, the control unit 52 is specifically configured to: receive a measurement request sent by the first base station, wherein the measurement request is configured to instruct the terminal to measure the second base station in the network device; and not respond to the measurement request.

In practical applications, when the current mode of the terminal is the dual-connection mode, the terminal may be adopted with a second power consumption adjustment strategy, thereby controlling the terminal to switch from the dual-connection mode to the single-connection mode.

Based on this, in some embodiments, the control unit 52 is specifically configured to: send SCG failure information to the first base station, wherein the SCG failure information indicates that dual connection fails; receive a SCG release indication message sent by the first base station; and release the dual-connection based on the SCG release indication message.

The SCG failure information may contain the measurement report of the second base station. Alternatively, NR SCG failure information may not contain the measurement report of the second base station.

It should be noted that, to prevent that after the terminal releases the dual-connection, the network device reconfigures the dual-connection mode according to the measurement report of the second base station sent by the terminal, the NR SCG failure information may not include the measurement report of the second base station.

The terminal may receive the SCG release indication message sent by the first base station through an RRC connection reconfiguration message.

After the dual-connection is released, the terminal may return to the single-connection mode from the dual-connection mode and remain in the single-connection mode.

It should be noted that, after the terminal is determined to disable the dual-connection mode, the terminal sends the SCG failure information to the network device, receives the SCG release indication message sent by the network device, and releases the dual-connection according to the SCG release indication message, thereby returning from the dual-connection mode to the single-connection mode, such that the terminal actively chooses not to communicate with the second base station in the non-independent network. Compared with the method in the related art that the terminal is required to communicate with the primary base station and the second base station, the power consumption of the terminal to communicate with the two base stations may be reduced, thereby increasing the standby time of the terminal.

In actual applications, the dual-connection mode may be determined to be disabled based on the temperature of the terminal, or the dual-connection mode may be determined to be enabled based on the temperature of the terminal.

Based on this, in some embodiments, the control unit 52 is specifically configured to: in response to the temperature being less than or equal to the first temperature threshold, control the terminal to switch from the single-connection mode to the dual-connection mode based on the power consumption adjustment strategy.

The preset thresholds corresponding to the determination to disable the dual-connection mode and the determination to enable the dual-connection mode may be the same or different.

The process of controlling the terminal to enable the dual-connection mode is similar to the process of controlling the terminal to disable the dual-connection mode, and will not be repeated here.

In practical applications, the obtaining unit 51 and the control unit 52 may be implemented by a processor in the apparatus for controlling power consumption of the terminal.

It should be noted that when the apparatus for controlling power consumption of the terminal provided in the above embodiments performs controlling, only the division of the above program modules is used for illustration. In actual applications, the above processing can be allocated by different program modules according to needs. That is, the internal structure of the apparatus may be divided into different program modules to complete all or part of the processing described above. In addition, the apparatus for controlling power consumption of the terminal provided in the above embodiments belongs to the same concept as the embodiments of the method for controlling power consumption of the terminal. For the specific implementation process, reference may be made to the method embodiments, which will not be repeated herein.

Figure 6:
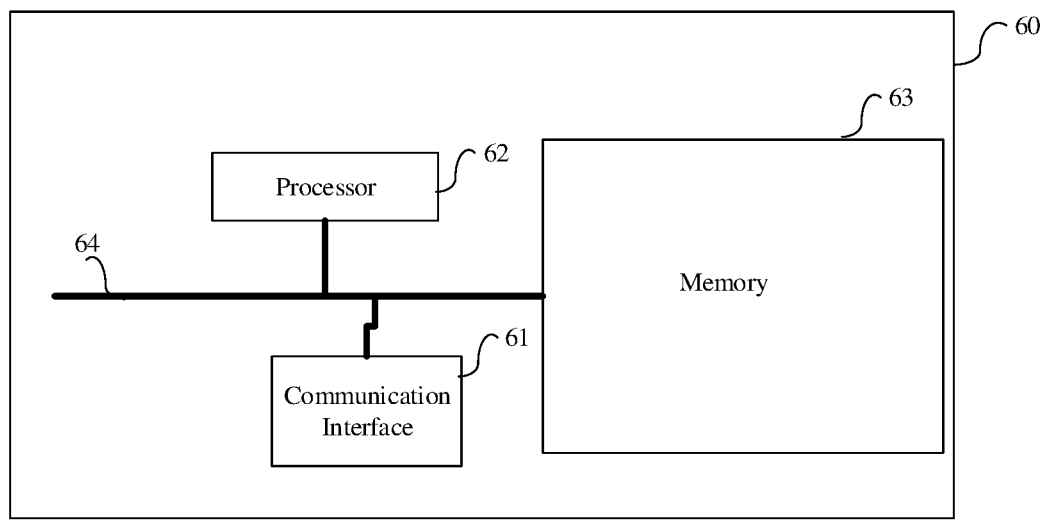
FIG. 6 is a composition structural schematic view of an apparatus for controlling power consumption of a terminal according to another embodiment of the present disclosure.

An embodiment of the present disclosure also provides an apparatus for controlling power consumption of a terminal. As shown in FIG. 6, the apparatus 60 includes a communication interface 61, a processor 62, and a memory 63.

The communication interface 61 is configured to exchange information with other devices.

The processor 62 is connected to the communication interface 61 and is configured to execute the method provided by one or more technical solutions on the smart device side when running a computer program. The computer program is stored in the memory 63.

Of course, in actual applications, the various components in the apparatus 60 are coupled together through a bus system 64. It can be understood that the bus system 64 is configured to implement connection and communication between these components. In addition to a data bus, the bus system 64 also includes a power bus, a control bus, and a state signal bus. However, for clarity of description, various buses are marked as the bus system 64 in FIG. 8.

The memory 63 in the embodiment of the present disclosure is configured to store various types of data to support the operation of the apparatus 60. Examples of the data include: any computer program for operating on the apparatus 60.

The methods disclosed in the foregoing embodiments of the present disclosure may be applied to the processor 62 or implemented by the processor 62. The processor 62 may be an integrated circuit chip with signal processing capability. In the implementation process, each step of the above method can be completed by an integrated logic circuit of hardware in the processor 62 or instructions in the form of software. The processor 62 may be a general-purpose processor, a digital signal processor (DSP), or other programmable logic devices, discrete gates or transistor logic devices, discrete hardware components, etc. The processor 62 can implement or execute the methods, steps, and logical block diagrams disclosed in the embodiments of the present disclosure. The general-purpose processor may be a microprocessor or any conventional processor. The steps of the method disclosed in the embodiments of the present disclosure can be directly embodied as being executed and completed by a hardware decoding processor, or executed and completed by a combination of hardware and software modules in the decoding processor. The software module may be located in a storage medium, and the storage medium is located in the memory 63. The processor 62 reads the information in the memory 63 and completes the steps of the foregoing method in combination with its hardware.

In some embodiments, the apparatus 60 may be implemented by one or more application specific integrated circuits (ASIC), DSPs, programmable logic device (PLD), complex programmable logic devices (CPLD), field-programmable gate arrays (FPGA), general-purpose processors, controllers, microcontroller units (MCU), microprocessors, or other electronic components to perform the above method.

It can be understood that the memory 63 in the embodiments of the present disclosure may be a volatile memory or a non-volatile memory, and may also include both volatile and non-volatile memory. The non-volatile memory may be read-only memory (ROM), programmable read-only memory (PROM), erasable programmable read-only memory (EPROM), electrically erasable programmable read-only memory (EEPROM), ferromagnetic random access memory (FRAM), flash memory, magnetic surface memory, disc, or compact disc read-only memory (CD-ROM); the magnetic surface memory may be magnetic disk storage or tape storage. The volatile memory may be a random access memory (RAM) configured as an external cache. By way of exemplary but not restrictive description, many forms of RAM are available, such as static random access memory (SRAM), synchronous static random access memory (SSRAM), dynamic random access Memory (DRAM), synchronous dynamic random access memory (SDRAM,), double data rate synchronous dynamic random access memory (DDRSDRAM), enhanced synchronous dynamic random access memory (ESDRAM), SyncLink connection dynamic random access memory (SLDRAM), and direct rambus random access memory (DRRAM). The memory described in the embodiments of the present disclosure is intended to include, but is not limited to, these and any other suitable types of memories.

It should be noted that: "first", "second", etc. are to distinguish similar objects, and not necessarily to describe a specific order or sequence.

In the several embodiments provided in the present disclosure, it should be understood that the disclosed apparatus and method may be implemented in other ways. The apparatus embodiments described above are merely illustrative. For example, the division of the units is only a logical function division, and there may be other divisions in actual implementation, such as: multiple units or components can be combined or can be integrated into another system, or some features can be ignored or not implemented. In addition, the coupling, or direct coupling, or communication connection between the components shown or discussed may be indirect coupling or communication connection through some interfaces, devices or units, and may be electrical, mechanical or other forms of.

The units described above as separate components may or may not be physically separate, and the components displayed as units may or may not be physical units, that is, they may be located in one place or distributed on multiple network units. Some or all of the units can be selected according to actual needs to achieve the purpose of the solution of the embodiments.

In addition, the functional units in the embodiments of the present disclosure can be all integrated into one processing module, or each unit can be individually used as a unit, or two or more units can be integrated into one unit; The unit can be implemented in the form of hardware, or in the form of hardware plus software functional units. Those skilled in the art can understand that all or part of the steps in the above method embodiments can be implemented by a program instructing relevant hardware. The program can be stored in a computer readable storage medium. When the program is executed, operations including the steps of the method embodiments are executed. The storage medium includes: various media that can store program codes, such as a mobile storage device, ROM, RAM, magnetic disk, or optical disk.

The methods disclosed in the several method embodiments provided in the present disclosure can be combined arbitrarily without conflict to obtain new method embodiments.

The features disclosed in the several product embodiments provided in the present disclosure can be combined arbitrarily without conflict to obtain new product embodiments.

The features disclosed in the several method or apparatus embodiments provided in the present disclosure can be combined arbitrarily without conflict to obtain a new method embodiment or device embodiment.

The above are only specific implementations of the present disclosure, but the scope of the present disclosure is not limited to this. Those skilled in the art can easily think of changes or substitutions within the technical scope disclosed in the present disclosure, which should be covered within the scope of the present disclosure. Therefore, the scope of the present disclosure should be subject to the scope of the claims.

What is claimed is:

1. A method for controlling power consumption of a terminal, comprising:

obtaining a temperature of the terminal;

in response to the temperature being greater than a first temperature threshold, controlling the terminal to switch from a dual-connection mode to a single-connection mode based on a power consumption adjustment strategy, comprising:

sending secondary cell group (SCG) failure information to the first base station, wherein the SCG failure information indicates a dual connection fails;

receiving a SCG release indication message sent by the first base station; and releasing the dual-connection based on the SCG release indication message to control the terminal to switch from the dual-connection mode to the single-connection mode; and in response to the terminal being in the dual-connection mode and the temperature being greater than a second temperature threshold, controlling a data transmission rate between the terminal and the second base station to switch from a first rate to a second rate; wherein the second temperature threshold is less than the first temperature threshold, and the second rate is less than the first rate;

wherein the terminal supports the dual-connection mode; the terminal is configured to communicate with a first base station and to communicate with a second base station in the dual- connection mode; wherein one of the first base station and the second base station is a new radio, NR, station, and the other is a long term evolution, LTE, station;

wherein in the single-connection mode, the terminal is disconnected from or not connected with the second base station, and remains a communication connection with the first base station.

2. The method according to claim 1, wherein obtaining the temperature of the terminal comprises:

obtaining the temperature of the terminal in response to receiving a first instruction, wherein the first instruction is configured to instruct to reduce the power consumption of the terminal.

3. The method according to claim 1, wherein controlling the data transmission rate between the terminal and the second base station from the first rate to the second rate comprises:

determining a first parameter, wherein the first parameter is configured to indicate a channel quality of the second base station;

reducing a value of the first parameter; and sending the reduced first parameter to the second base station; wherein the reduced first parameter is configured to control a downlink transmission rate to switch from the first rate to the second rate.

4. The method according to claim 3, wherein the value of the first parameter is a reported value of channel quality indicator (CQI); the reducing the value of the first parameter comprises:

measuring a cell and obtaining a measurement result;

determining a decoding error rate of a physical downlink shared channel based on the measurement result;

determining the reported value of the CQI based on the decoding error rate; and reducing the reported value of the CQI based on a preset value.

5. The method according to claim 1, wherein controlling the data transmission rate between the terminal and the second base station from the first rate to the second rate comprises:

determining a second parameter, wherein the second parameter is configured to indicate data amount of uplink data to be sent by the terminal to the second base station;

reducing a value of the second parameter; and sending the reduced second parameter to the second base station, wherein the reduced second parameter is configured to control an uplink transmission rate to switch from the first rate to the second rate.

6. The method according to claim 5, wherein the value of the second parameter is a value of a buffer status report (BSR); the reducing the value of the second parameter comprises:

reducing the amount of data reported by the BSR based on a preset value.

7. The method according to claim 1, wherein controlling the data transmission rate between the terminal and the second base station from the first rate to the second rate comprises:

controlling an uplink transmission rate for communication with the second base station to switch from the first rate to the second rate by reducing an uplink transmission power.

8. The method according to claim 1, after controlling the data transmission rate between the terminal and the second base station from the first rate to the second rate, further comprising:

determining whether the temperature is greater than the first temperature threshold; and in response to the temperature being greater than the first temperature threshold, controlling the terminal to switch from the dual-connection mode to the single-connection mode based on the power consumption adjustment strategy.

9. The method according to claim 1, further comprising:

in response to the temperature less than or equal to the first temperature threshold, controlling the terminal to switch from the single-connection mode to the dual-connection mode based on the power consumption adjustment strategy.

10. The method according to claim 1, wherein controlling the data transmission rate between the terminal and the second base station from the first rate to the second rate comprises:

replacing a data packet of an ACK response to a physical downlink shared channel with a data packet of a NACK response to the physical downlink shared channel.

11. The method according to claim 1, wherein controlling the data transmission rate between the terminal and the second base station from the first rate to the second rate comprises:

reducing an uplink transmission rate for communication with the second base station by reducing a transmission rate of uplink data sent by an application layer of the terminal to a modem of the terminal.

12. The method according to claim 1, wherein after controlling the terminal to switch from the dual-connection mode to the single-connection mode based on the power consumption adjustment strategy, further comprising:

when receiving a measurement request sent by the first base station, not responding to or not reporting the measurement request, wherein the measurement request is configured to instruct the terminal to measure the second base station.

13. An apparatus for controlling power consumption of a terminal, comprising: a memory, a processor, and a computer program stored in the memory and executable on the processor; wherein the processor is configured to execute the computer program to perform:
 obtaining a temperature of the terminal;
 in response to the temperature being greater than a first temperature threshold, controlling the terminal to switch from a dual-connection mode to a single-connection mode based on a power consumption adjustment strategy, comprising:
  sending secondary cell group (SCG) failure information to the first base station, wherein the SCG failure information indicates a dual connection fails;
  receiving a SCG release indication message sent by the first base station; and
  releasing the dual-connection based on the SCG release indication message to control the terminal to switch from the dual-connection mode to the single-connection mode; and
 in response to the terminal being in the dual-connection mode and the temperature being greater than a second temperature threshold, controlling a data transmission rate between the terminal and the second base station to switch from a first rate to a second rate; wherein the second temperature threshold is less than the first temperature threshold, and the second rate is less than the first rate;
 wherein the terminal supports the dual-connection mode; the terminal is configured to communicate with a first base station and to communicate with a second base station in the dual-connection mode; wherein one of the first base station and the second base station is a new radio, NR, station, and the other is a long term evolution, LTE, station;
 wherein in the single-connection mode, the terminal is disconnected from or not connected with the second base station, and remains a communication connection with the first base station.

14. The apparatus according to claim 13, wherein obtaining the temperature of the terminal comprises:
 obtaining the temperature of the terminal in response to receiving a first instruction, wherein the first instruction is configured to instruct to reduce the power consumption of the terminal.

15. The apparatus according to claim 13, controlling the data transmission rate between the terminal and the second base station from the first rate to the second rate comprises:
 determining a first parameter, wherein the first parameter is configured to indicate a channel quality of the second base station;
 reducing a value of the first parameter; and
 sending the reduced first parameter to the second base station; wherein the reduced first parameter is configured to control a downlink transmission rate to switch from the first rate to the second rate.

16. The apparatus according to claim 13, wherein controlling the data transmission rate between the terminal and the second base station from the first rate to the second rate comprises:
 determining a second parameter, wherein the second parameter is configured to indicate data amount of uplink data to be sent by the terminal to the second base station;
 reducing a value of the second parameter; and
 sending the reduced second parameter to the second base station, wherein the reduced second parameter is configured to control an uplink transmission rate to switch from the first rate to the second rate.

17. A non-transitory computer-readable storage medium, storing a computer instruction; wherein the computer instruction is executed by the processor to perform:
 obtaining a temperature of the terminal;
 in response to the temperature being greater than a first temperature threshold, controlling the terminal to switch from a dual-connection mode to a single-connection mode based on a power consumption adjustment strategy, comprising:
  sending secondary cell group (SCG) failure information to the first base station, wherein the SCG failure information indicates a dual connection fails;
  receiving a SCG release indication message sent by the first base station; and
  releasing the dual-connection based on the SCG release indication message to control the terminal to switch from the dual-connection mode to the single-connection mode; and
 in response to the terminal being in the dual-connection mode and the temperature being greater than a second temperature threshold, controlling a data transmission rate between the terminal and the second base station to switch from a first rate to a second rate; wherein the second temperature threshold is less than the first temperature threshold, and the second rate is less than the first rate;
 wherein the terminal supports the dual-connection mode; the terminal is configured to communicate with a first base station and to communicate with a second base station in the dual-connection mode; wherein one of the first base station and the second base station is a new radio, NR, station, and the other is a long term evolution, LTE, station;
 wherein in the single-connection mode, the terminal is disconnected from or not connected with the second base station, and remains a communication connection with the first base station.

* * * * *